United States Patent [19]

Straub

[11] Patent Number: 5,525,146
[45] Date of Patent: Jun. 11, 1996

[54] ROTARY GAS SEPARATOR

[75] Inventor: Peter H. G. Straub, Leduc, Canada

[73] Assignee: Camco International Inc., Houston, Tex.

[21] Appl. No.: 332,917

[22] Filed: Nov. 1, 1994

[51] Int. Cl.[6] .................................................. B01D 19/00
[52] U.S. Cl. ............................ 96/214; 96/217; 166/105.5
[58] Field of Search ................................. 95/261; 96/207, 96/208, 214, 217; 166/68, 68.5, 105.5

[56] References Cited

U.S. PATENT DOCUMENTS

| | | | |
|---|---|---|---|
| 2,525,233 | 10/1950 | Miller | 166/105.5 |
| 3,627,453 | 12/1971 | Clark | 418/48 |
| 3,887,342 | 6/1975 | Bonnelle | 96/214 |
| 4,080,115 | 3/1978 | Sims et al. | 418/48 |
| 4,481,020 | 11/1984 | Lee et al. | 96/214 |
| 4,981,175 | 1/1991 | Powers | 95/259 |
| 5,048,622 | 9/1991 | Ide | 175/107 |

*Primary Examiner*—Robert J. Warden
*Assistant Examiner*—Theresa T. Snider

[57] ABSTRACT

A rotary gas separator for use with a progressive cavity pump which includes a separation housing having an internal separation chamber with a bladed separator rotatably mounted therewithin for separating introduced fluid into a gas constituent and a liquid constituent. Coupling mechanisms are mounted on a first end of the bladed separator for connection to a rotor of a progressive cavity pump, and for permitting limited longitudinal movement and limited transverse movement between the bladed separator and the rotor to prevent bearing failure within the drive train of the pump.

8 Claims, 3 Drawing Sheets

FIG. 3
FIG. 4
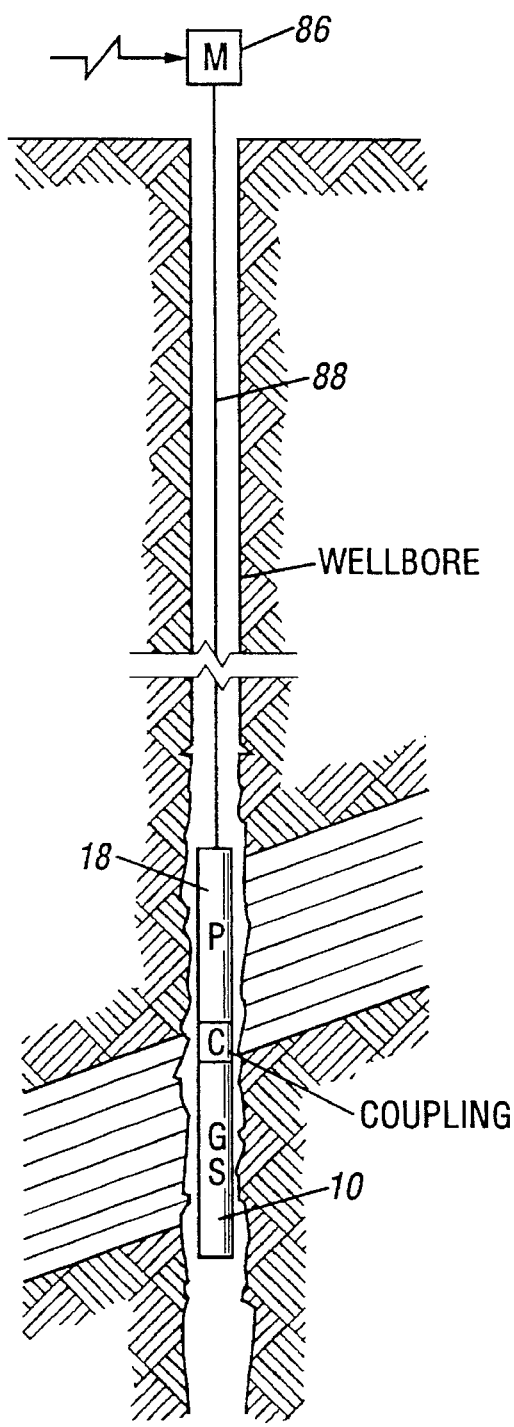
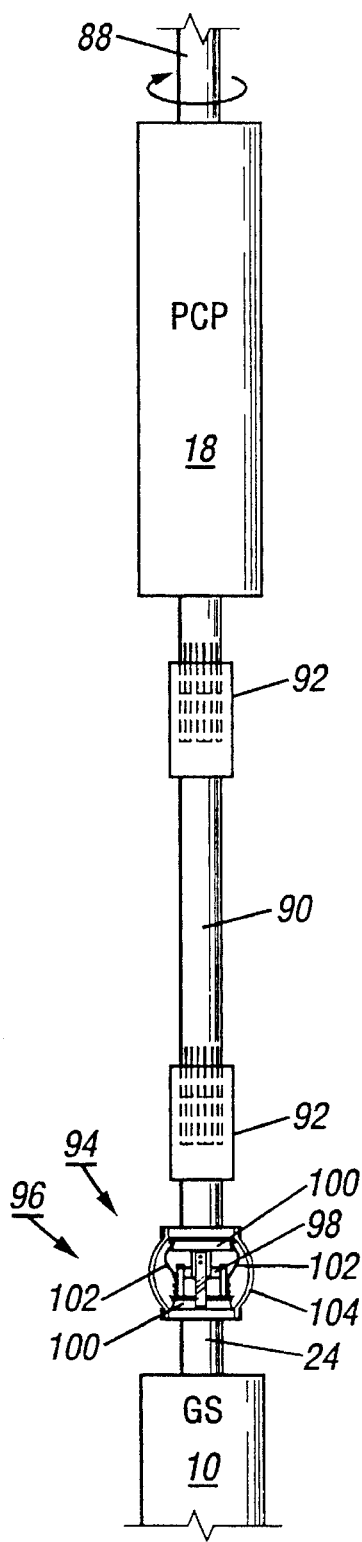

ROTARY GAS SEPARATOR

BACKGROUND OF THE INVENTION

1. Field of the Invention

The present invention relates to a rotary gas separator and, more particularly, to such a rotary gas separator that is adapted to be operated with a progressive cavity pump.

2. Description of Related Art

Electric submergible pumping systems (SPS's) and sucker rod pumps are commonly used to move oil and gas from a subterranean formation through a wellbore to the earth's surface. When viscous fluids and/or fluids with relatively high concentrations of sand are to be moved and, if gas is present, these types of pumps have not proven to be as reliable as desired.

If the ratio of gas-to-oil in fluids being moved is excessive, the gas will come out of solution within the pump and cause gas lock, whereby the pump will cease to move any fluid. To prevent such detrimental gas lock, rotary gas separators are often used to separate as much gas as possible from the wellbore fluids prior to the fluids entering the pump's inlet. Rotary gas separators typically used with SPS's are disclosed in U.S. Pat. Nos. 2,525,233; 3,887,342; 4,481,020; 4,676,308; and 4,981,175. When viscous fluids and/or fluids with relatively high concentrations of sand are to be moved, Moineau pumps or progressive cavity pumps (PCP's) have been operated by a rotating rod string extending to the earth's surface or through a gear reduction system to an SPS's electric motor. Examples of progressive cavity pumps are disclosed in U.S. Pat. Nos. 3,627,453; 4,080,115; and 5,048,622.

The hindrance to the successful operation of a PCP with a drive train of the above types is that the progressive cavity pump inherently causes oscillations and gyrations that propagate through the drive train and destroys the bearings therein. These oscillations and gyrations are hereinafter referred to as "non-coaxial" forces, and have been found to be of sufficient magnitude to damage bearings. The failed pump and drive train must then be removed from the wellbore, which causes the operator to suffer loss of production, loss of revenue and additional repair costs.

The non-coaxial forces are caused by the rotor in the progressive cavity pump being in the shape of a helix contained within a cavity or a flexible lining within a housing, referred to as the stator. The rotor rolls with respect to the stator so that the rotor and stator form a series of sealed cavities which are approximately 180 degrees apart. As one cavity increases in size, its counterpart cavity decreases in size, at exactly the same rate. The driving motion of the rotor is quite complex in that it is simultaneously rotating and moving transversely with respect to the stationary stator's liner. The rotation of the true center of the rotor traces a circle progressing the opposite direction to the rotation of the rotor, but with the same speed. Thus, the rotor driving motion is simultaneously a rotation, an oscillation, and a reverse orbit. It is a combination of these motions acting at the point of interconnection of the drive train that cause the undesired non-coaxial forces to be destructively transmitted to the bearings within the drive train.

SUMMARY OF THE INVENTION

The present invention has been contemplated to overcome the foregoing deficiencies and meet the above described needs. Specifically, the present invention is a rotary gas separator for use with a progressive cavity pump that can successfully operate for longer periods of time than previous equipment without bearing failure. The rotary gas separator of the present invention includes a separation housing having an internal separation chamber with a bladed separator rotatably mounted therewithin for separating the introduced fluid into a gas constituent and a liquid constituent. Coupling mechanisms are mounted on a first end of the bladed separator for connection to a rotor of the progressive cavity pump. The coupling mechanisms permit relative longitudinal movement between the PCP's rotor and the bladed separator to protect the bearings in the gas separator and the drive train from damage when the PCP's rotor is driven downwardly and then pulled upwardly during its installation. Further, the ability of the coupling mechanisms to permit limited transverse displacement of the PCP's rotor and the bladed separator protect the bearings in the gas separator and the drive train from the inherent non-coaxial forces produced by the PCP's rotor.

BRIEF DESCRIPTION OF THE DRAWINGS

FIG. 3 is an elevational view of one preferred embodiment of a rotary gas separator of the present invention driven by a surface driven rod string.

FIG. 4 is an elevational cross-sectioned view of one preferred coupling mechanism used to connect a progressive cavity pump to a rotary gas separator of the present invention.

DETAILED DESCRIPTION OF THE PREFERRED EMBODIMENTS

As has been briefly described above, the present invention is a rotary gas separator for use with a progressive cavity pump. It should be understood that the rotary gas separator of the present invention can be used with an electric submergible pumping system (SPS), with a multi-staged centrifugal pump or a progressive cavity pump, and with a progressive cavity pump or the like driven through a rotating rod string.

Figure 1:
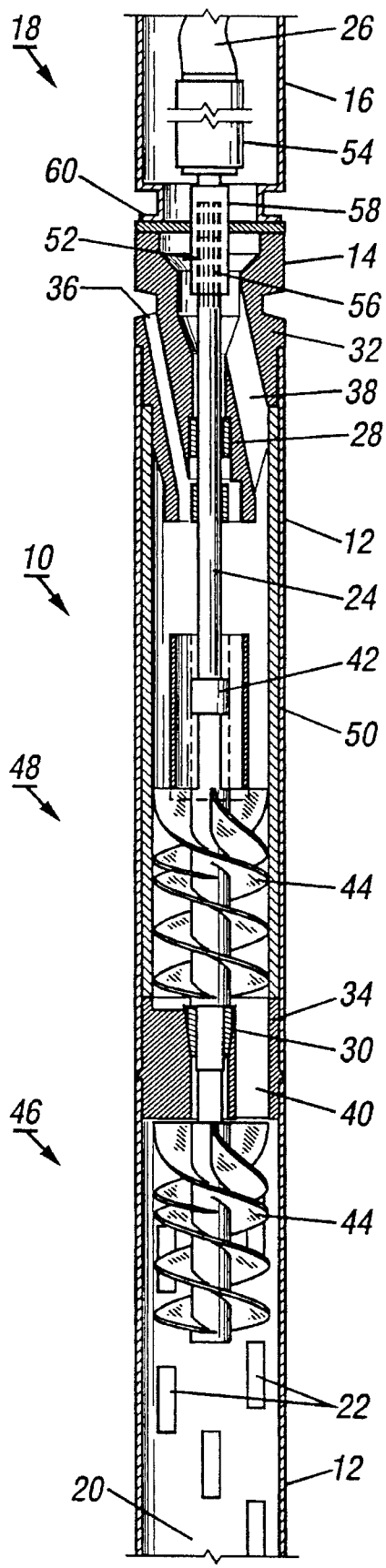
FIG. 1 is an elevational cross-sectioned view of one preferred embodiment of a rotary gas separator of the present invention.

As shown in FIG. 1, one preferred embodiment of a rotary gas separator 10 of the present invention includes an elongated tubular housing 12 with an annular flanged connector head 14 at a first end thereof for connection of the housing 12 to a lower end of a housing of a pump, such as a housing 16 of a progressive cavity pump 18. A lower end of the housing 12 includes a bottom opening 20 and/or one or more slotted openings 22 in a sidewall of the housing 12. These openings 20 and 22 permit wellbore fluids to be introduced into the interior of the housing 12, which can be referred to as the "separation chamber" of the gas separator 10.

A longitudinal shaft 24 extends into the interior of the housing 12 and is connected at a first end thereof by means of one or more coupling mechanisms, to be described in detail below, to a lower end of a rotor 26 of the progressive cavity pump 18. The shaft 24 is mounted for rotary motion within the housing 12 by an upper bearing or sleeve 28 and a lower bearing or sleeve 30. Any suitable bearings can be used; however, preferably, the bearings 28 and 30 comprise compliant ceramic bushings of the type disclosed in U.S.

Pat. No. 5,209,577, which is commonly assigned hereto and which is herein incorporated by reference. The bearings or sleeves 28 and 30 are mounted within cylindrical supports 32 and 34, respectively, with the upper cylindrical support 32 including one or more openings 38 to permit the escape of separated liquids, such as oil and water, from the separation chamber into the housing 16 of the progressive cavity pump 18. The upper cylindrical support 32 also includes one or more openings 36 to permit the escape of separated gas from the separation chamber to the exterior of the gas separator 10 and into an annular space between the pump and the wellbore's casing (not shown). The lower cylindrical support 34 includes one or more openings 40 longitudinally therethrough to permit introduced fluid to be moved past the support 34 and bearing 30 and be moved further upwardly within the gas separator 10.

The shaft 24 includes one or more mechanisms to separate the introduced fluid into a separated gas constituent and a separated liquid constituent. These mechanisms can comprise a plurality of longitudinal blades 42, and/or one or more helical screws 44. As shown in FIG. 1, one preferred embodiment of the gas separator 10 of the present invention includes a first helical screw and blade set 46 connected to a lower end of the shaft 24 below the lower support 34, and includes a second helical screw and blade set 48 connected to the shaft 24 between the upper and the lower supports 32 and 34, and most preferably adjacent the lower support 34. The spacing between the upper end of the second helical screw set 48 and the liquid outlet(s) 38 and the gas outlet(s) 36 is selected to permit sufficient space for the higher density fluids, i.e. the oil and water, to move towards the interior wall of the housing 12 and for the lighter density fluid, i.e. the gas, to move towards the center of the housing 12.

In one preferred embodiment of the present invention, an abrasion resistant liner 50 is mounted coaxially within the housing 12 and is sealably connected to the upper support 32 and to the lower support 34. The purpose of the liner 50 is to reduce the overall cost of the rotary gas separator 12, in other words, when abrasive fluids are to be moved through the gas separator 12 only the interior of the housing 12, and in this case the liner 50, needs to be made out of relatively expensive abrasion resistant material, such as stainless steel or a mild steel with an abrasion-resistant coating; whereas, the other portions of the housing 12 can be made from relatively inexpensive steel.

The coupling mechanisms that enable the rotary gas separator 10 of the present invention to be successfully used with a progressive cavity pump are comprised of a coaxial splined coupling 52 and a joint assembly 54. The splined coupling 52 is generally comprised of the upper end of the shaft 24 including a series of parallel and longitudinal grooves 56 with a sleeve 58 connected to a lower end of the rotor 26. The sleeve 58 has an internal diameter slightly greater than the outer diameter of the shaft 24, with an internal surface thereof including a series of parallel and longitudinal teeth 60 that cooperate with the grooves 56. The upper end of the shaft 24 extends into the sleeve 58, but is spaced downwardly from the lower end of the rotor 26, so that the rotor 26 can be moved downwardly and upwardly with respect to the shaft 24 without translating such movement into a force that might act upon and thereby damage the bearings 28 and 30.

Figure 2:
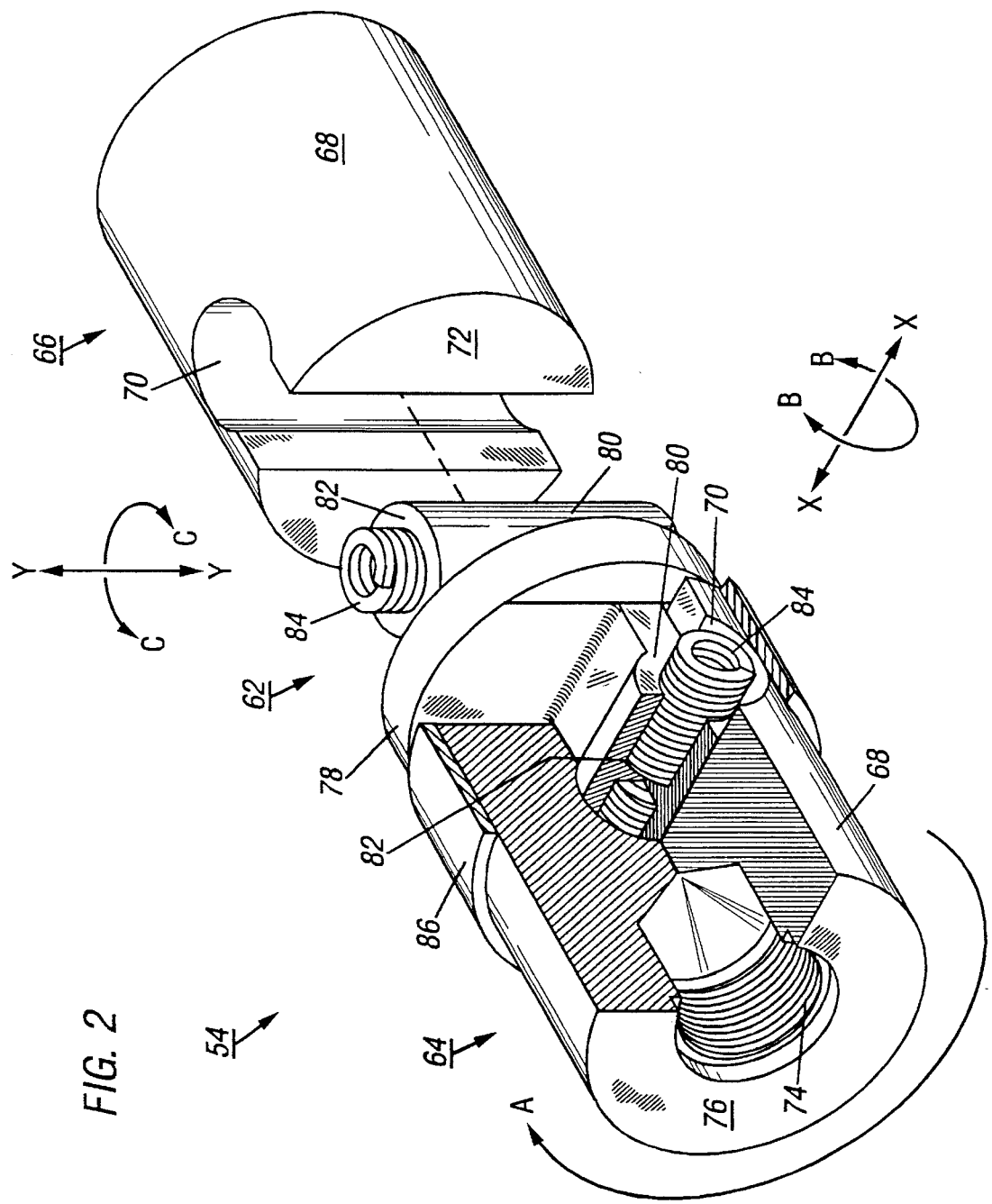
FIG. 2 s a perspective view of one preferred embodiment of a joint assembly for use with a rotary gas separator of the present invention.

The joint assembly 54 is provided to permit limited transverse movement between the shaft 24 and the rotor 26 along at least two coplanar axes in order to compensate for and prevent non-coaxial forces from being transferred to and thereby damage the bearings 28 and 30. One preferred embodiment of the joint assembly 54 is disclosed in U.S. Pat. No. 5,421,780 issued Jun. 6, 1995, which is commonly assigned hereto and which is incorporated herein by reference, and as shown in FIG. 2. An alternative preferred embodiment of the joint assembly is shown in FIG. 3, and will be described below in detail.

As shown in FIG. 2, one preferred embodiment of the joint assembly 54 of the present invention comprises a connecting body 62 located between a first subunit 64 and a second subunit 66. Each subunit 64 and 66 comprises a generally cylindrical body 68 with a transverse slot or opening 70 extending at least partially across the body 68 adjacent a first end 72 thereof. The opening 70 can be of any desired shape, such as rectangular, rounded and, preferably, C-shaped. Each body 68 includes means for drive train interconnection 74, such as a threaded male protrusion, a threaded female opening or a multi-faceted opening in a second end 76 thereof. The connecting body 62 comprises a central body in the form of a disc 78 to which at least one transverse cylindrical member 80 extends out therefrom on each opposite face or end of the disc 78. The cylindrical members 80 can be separately made and then mechanically connected to the opposite ends of the disc 78, or such cylindrical members 80 can be formed as an integral part of the disc 78, as shown in FIG. 2. Further, the connecting body 62 can comprise only the cylindrical members 80 connected directly each to the other transverse to a central axis (center line), thus without the disc 78.

Each cylindrical member 80 defines a reference transverse axis, either X—X or Y—Y, coaxial with and parallel to the openings 70 in the subunits 64 and 66. The axis X—X and the axis Y—Y are parallel and coplanar to each other, but are preferably rotated from about 45° to about 120° relative to each other. For the preferred embodiment shown in FIG. 2, the axis X—X and axis Y—Y are approximately perpendicular (i.e. rotated about 90°) relative to each other.

The size, shape and configuration of the cylindrical members 80 is chosen so that they will fit within the transverse openings 70 and permit sliding motion along the axes X—X and Y—Y. The cross-sectional configuration of the cylindrical members 80 need not be cylindrical, but can be spherical, square, triangular, T-shaped or of any configuration desired as long as each such member 80 fits within and is, preferably, partially restrained by the configuration and relevant dimension of the corresponding opening 70 in each subunit 64 and 66.

When the rotor 26 of the pump 18 is rotated in Direction A about its longitudinal center line, the non-coaxial forces from the pump 18 tend to push the longitudinal center line of the lower end of the rotor 26 along axis X—X and/or axis Y—Y, and away from the center line of the joint assembly 54. Rather than having the second subunit 66 be "buckled" or angularly displaced, as is the case in conventional universal joints, the second subunit 66 can be displaced or slid laterally out of coaxial alignment but still within, parallel axial alignment, as the lateral forces are permitted to cause limited sliding or transverse displacement of the components, i.e. first subunit 64 displaced along axis X—X and/or axis Y—Y. The non-coaxial forces are thus eliminated or at least minimized by this sliding motion and such forces have been found to not be transferred to the bearings 28 and 30 of the rotary gas separator 12, as well as to the SPS's electric motor.

To assist in preventing the connecting body 62 from rapidly sliding back and forth along the axis X—X and/or the axis Y—Y, i.e. akin to a chattering motion or vibration, and to prevent the components from remaining longitudinally displaced when the drive train is under compression or tension, a restorative biasing mechanism is provided for biasing the subunits 64 and 66 to coaxial alignment. This biasing mechanism includes at least one longitudinal, and preferably, coaxial bore 82 that extends at least partially into each cylindrical member 80. As shown in FIG. 2, if two coaxial or parallel bores 82 are provided, each need not intersect. A spring 84 is disposed in each bore 82, and the length of each of the cylindrical members 80 is less than the diameter of the body 68 so that an outer end of each spring 84 extends partially out from the bore 82. An outer sleeve 86 is slid or assembled around each of the bodies 68 to at least partially encompass the areas adjacent the outer ends of the openings 70 and to compress and restrain the springs 84. The outer sleeves 86 are secured in place by set screws (not shown) or other suitable devices. In operation, this biasing mechanism causes the connecting body 62 to be forced (by action of the springs 84) back towards the longitudinal center line in the event that noncoaxial forces have caused some lateral movement (ie. sliding) of the subunits 64 and 66.

In certain circumstances where greater transverse component displacement is desired, one or more additional connecting bodies can be added to the joint assembly 54. The connecting body is connected to the first subunit 64 in the manner described previously, but is connected to the second subunit 66 through an intermediary body. The intermediary body comprises a generally cylindrical body with a transverse C-shaped slot or opening in a first end thereof into which is received the second cylindrical member on the second end of the connecting body, and includes springs and the outer sleeve, all as described previously. A second, opposite end of the intermediary body includes a transverse cylindrical member, which is received into the transverse C-shaped opening in the second subunit, in the manner as previously described.

In this alternate embodiment, a third axis Z—Z extends out from the longitudinal center line of the opening of the second subunit, while the first axis X—X extends out from the longitudinal center line of the opening of the first subunit and the second axis Y—Y extends out from the longitudinal center line of the opening in the intermediary body. The degrees of rotation of the three axes with respect to each other need not be uniform nor add up to 180°. For example, axis Y—Y can be about 45° rotated from axis X—X, and axis Z—Z can be about 45° rotated from axis Y—Y. Preferably, axis Y—Y is rotated from about 45° to about 120° relative to axis X—X and axis Z—Z. Most preferably, axis Y—Y is rotated about 60° relative to axis X—X and axis Z—Z is rotated about 60° relative to axis Y—Y.

Alternatively, the rotary gas separator 10 of the present invention can be installed within an SPS as follows, starting from the top or first end of the assembly: a lower end of a drive shaft of the pump 18 is connected through the splined coupling 52 and/or joint assembly 54, to the gas separator 10 with a lower end of the shaft 24 connected to a planetary gear drive (if used), and then to an electric motor, as is well known to those skilled in the art.

An alternate preferred embodiment of the gas separator 10 of the present invention is shown in FIG. 3, wherein a progressive cavity pump 18 is driven by way of a surface mounted, electric motor 86 through a rotating rod string 88. The gas separator 10 is connected to a lower end of the progressive cavity pump 18 through one or both coupling mechanisms, as described above, such as the coaxial splined shafts 52 and/or the joint assembly 54. Alternatively, as shown in FIG. 4, a relatively short "pony" rod 90 is used to interconnect the lower end of the pump's rotor to an upper end of the gas separator's shaft 24. The pony rod 90 is preferably made from a relatively flexible material, such as fiberglass, graphite composite or mild strength steel, and is from about two (2) feet to about ten (10) feet in length. A splined shaft coupling 92 is included at the upper end, at the lower end or at both ends of the pony rod 90 to permit limited longitudinal movement between the pump 18 and the gas separator 10. The coupling 92 is preferably similar in configuration to the splined coupling 52, as described hereinabove.

The purpose of the pony shaft 90 is to permit limited transverse or lateral movement between the end of the pump's rotor and the gas separator's shaft 24. As described above, the lower end of the pump's shaft has oscillations which must be compensated for to prevent damage to the gas separator's bearings; therefore, the pony rod 90 is chosen so that its natural flexibility will absorb and dampen the detrimental oscillations prior to being passed to the gas separator 10. Also, a coupling joint 94 can be used in place of or, preferably, in addition to one or both of the splined couplings 92. The coupling joint 94 can be a commercially available universal joint as normally used in drive trains, the same joint assembly 54 as described above, or preferably a spring biased joint 96. A spring biased joint is comprised of two .transverse yokes 98 pinned together in the form of a typical universal joint, with each yoke 98 including an annular recess 100 therearound and into which one end of a curved spring 102 is nested. An opposite end of each curved spring 102 is connected to the opposite yoke 98. The springs 102 urge the yokes 98 into coaxial alignment, such as during installation. The components of the spring biased joint 96 are protected from well bore fluids by being encased within a sealed elastomeric bag or boot 104, which can be air filled or filled with grease. The spring biased joint 96 permits additional component displacement, and the use of the pony rod 90 and the splined couplings 92 prevent all but the most severe vibrations and motions from damaging the bearings within the drive train and/or within the gas separator 10.

Whereas the present invention has been described in relation to the drawings attached hereto, it should be understood that other and further modifications, apart from those shown or suggested herein, may be made within the scope and spirit of the present invention.

What is claimed is:

1. A rotary gas separator for use with a progressive cavity pump, comprising:

a separation housing having an internal separation chamber;

blade means mounted for rotary motion within the separation chamber for separating introduced fluid into a gas constituent and a liquid constituent; and coupling means for connecting a first end of the blade means to a rotor of a progressive cavity pump and for permitting limited longitudinal and limited transverse movement between the blade means and the rotor, wherein the coupling means further comprises a joint assembly permitting limited transverse component displacement along at least two coplanar axe comprising:

a first subunit and a second subunit, each subunit having a transverse opening in a first end thereof:

a connecting body having a first member extending from a first end thereof and a second member extending from an opposite second end thereof; and the first member received into the transverse opening in the first subunit to permit limited displacement along a first axis X—X parallel to such opening, and the second member received into the transverse opening in the second subunit to permit limited displacement along a second axis Y—Y parallel to such opening.

2. A rotary gas separator of claim 1 wherein the blade means further comprises a plurality of longitudinal blades connected to a longitudinal shaft mounted within bearings within the separation housing, with a first end of the shaft connected to the coupling means.

3. A rotary gas separator of claim 1 and including a coaxial splined coupling permitting limited longitudinal movement between a first end of the blade means and the rotor.

4. A rotary gas separator for use with a progressive cavity pump, comprising:

an elongated tubular housing having a first end with means for connection to a lower end of a housing of a progressive cavity pump, and with a second end having at least one opening to permit fluid to enter the interior of the housing;

blade means mounted for rotary motion within the separation chamber for separating introduced fluid into a gas constituent and a liquid constituent, the blade means further comprises a plurality of longitudinal blades connected to a longitudinal shaft with the shaft mounted within at least two bearings within the tubular housing, the bearings including fluid passageways to permit the introduced fluids to flow therepast; and coupling means for connecting a first end of the shaft to a rotor extending outwardly from the housing of the progressive cavity pump and for permitting limited longitudinal and limited transverse movement between the shaft and the rotor along at least two coplanar axes, the coupling means further comprises a coaxial splined coupling and a joint assembly comprising a first subunit and a second subunit, each subunit having a transverse opening in a first end thereof, a connecting body having a first member extending from a first end thereof and a second member extending from an opposite second end thereof, and the first member being adapted to be received into the transverse opening in the first subunit to permit limited displacement along a first axis parallel to such opening, and the second member being adapted to be received into the transverse opening in the second subunit to permit limited displacement along a second axis parallel to such opening.

5. A rotary gas separator for use with a progressive cavity pump, comprising:

an elongated tubular housing having a first end with means for connection to a lower end of a housing of a progressive cavity pump, and with a second end having at least one opening to permit fluid to enter the interior of the housing;

blade means mounted for rotary motion within the separation chamber for separating introduced fluid into a gas constituent and a liquid constituent, the blade means further comprises a plurality of longitudinal blades connected to a longitudinal shaft with the shaft mounted within at least two bearings within the tubular housing, the bearings including fluid passageways to permit the introduced fluids to flow therepast; and coupling means for connecting a first end of the shaft to a rotor extending outwardly from the housing of the progressive cavity pump and for permitting limited longitudinal and limited transverse movement between the shaft and the rotor, the coupling means further comprises a flexible rod having at one thereof a coaxial splined coupling permitting limited longitudinal movement between a first end of the rod and the rotor, and having at a second end thereof a universal joint.

6. A rotary gas separator for use with a progressive cavity pump, comprising:

a separation housing having an internal separation chamber;

blade means mounted for rotary motion within the separation chamber for separating introduced fluid into a gas constituent and a liquid constituent; and coupling means for connecting a first end of the blade means to a rotor of a progressive cavity pump and for permitting limited longitudinal and limited transverse movement between the blade means and the rotor, wherein the coupling means further comprises a flexible rod having at one end thereof a coaxial splined coupling permitting limited longitudinal movement between a first end of the rod and the rotor.

7. A rotary gas separator of claim 6 wherein the flexible rod includes a universal joint on a second end thereof.

8. A rotary gas separator for use with a progressive cavity pump, comprising;

a separation housing having an internal separation chamber;

blade means mounted for rotary motion within the separation chamber for separating introduced fluid into a gas constituent and a liquid constituent; and coupling means for connecting a first end of the blade means to a rotor of a progressive cavity pump and for permitting limited longitudinal and limited transverse movement between the blade means and the rotor, wherein the coupling means further comprises a flexible rod having at one end thereof a universal joint.

* * * * *